(12) United States Patent
Ito

(10) Patent No.: US 6,893,824 B2
(45) Date of Patent: May 17, 2005

(54) GENE DETECTION SYSTEM, GENE DETECTION DEVICE COMPRISING SAME, DETECTION METHOD, AND GENE DETECTING CHIP

(75) Inventor: Tetsumasa Ito, Matsudo (JP)

(73) Assignees: SII Nano Technology, Inc., Chiba (JP); Tum Gene, Inc., Chiba (JP)

( * ) Notice: Subject to any disclaimer, the term of this patent is extended or adjusted under 35 U.S.C. 154(b) by 0 days.

(21) Appl. No.: 10/050,608

(22) Filed: Jan. 18, 2002

(65) Prior Publication Data

US 2002/0155477 A1 Oct. 24, 2002

(30) Foreign Application Priority Data

Jan. 19, 2001 (JP) ........................................ 2001-012415

(51) Int. Cl.[7] ............................ C12Q 1/68; C12M 1/00; G01N 15/06; C07H 21/04
(52) U.S. Cl. ........................ 435/6; 435/174; 435/283.1; 435/287.2; 435/287.3; 422/68.1; 422/82.01; 536/23.1; 536/24.3
(58) Field of Search ........................ 435/6, 174, 283.1, 435/287.2, 287.3; 536/24.3, 23.1; 422/68.1, 82.01

(56) References Cited

U.S. PATENT DOCUMENTS

| | | | |
|---|---|---|---|
| 4,343,684 A | | 8/1982 | Lechtzen |
| 4,840,893 A | | 6/1989 | Hill et al. |
| 4,857,831 A | * | 8/1989 | Davies et al. ................ 324/357 |
| 5,108,576 A | * | 4/1992 | Malmros et al. ......... 205/777.5 |
| 5,605,662 A | * | 2/1997 | Heller et al. ............... 422/68.1 |
| 5,614,004 A | | 3/1997 | Wachi |
| 5,856,174 A | * | 1/1999 | Lipshutz et al. ......... 435/286.5 |
| 5,866,321 A | * | 2/1999 | Matsue et al. ................. 435/5 |
| 5,873,992 A | | 2/1999 | Glezen |
| 6,048,692 A | | 4/2000 | Maracas et al. |
| 6,093,370 A | * | 7/2000 | Yasuda et al. .............. 422/68.1 |
| 6,126,800 A | | 10/2000 | Caillat et al. |
| 6,340,568 B2 | | 1/2002 | Hefti |
| 6,368,851 B1 | | 4/2002 | Baumann et al. |
| 6,749,731 B2 | * | 6/2004 | Kobori et al. ......... 204/403.01 |

FOREIGN PATENT DOCUMENTS

| | | |
|---|---|---|
| JP | 56-152958 A | 11/1981 |
| JP | 9288080 | 11/1997 |
| JP | 09-288085 | 11/1997 |

OTHER PUBLICATIONS

Bain, C. D. et al., Formation of Monolayer Films by the Spontaneous Assembly of Organic Thiols from Solution onto Gold, J. Am. Chem. Soc., 111: 321–335 (1989).

Gooding, J. J. et al., Platinum–Catalyzed Enzyme Electrodes Immobilized on Gold Using Self–Assembled Layers, Anal. Chem, 70: 2396–2402 (1998).

Ihara, Toshihiro et al., "Synthesizing and Applying the Bis–Intercalator as an Electrochemical Detection Probe of DNA," Proceedings of the Japan Society for Analytical Chemistry, p. 54 (1989).

Takanaga, Shigeori et al., "Synthesizing the Electrochemical Threading Type Intercalator and Applying the Electrochemical Threading Type Intercalator to a DNA Sensor," Proceedings of the Japan Society for Analytical Chemistry, pp. 137–138 (1996).

(Continued)

*Primary Examiner*—BJ Forman
(74) *Attorney, Agent, or Firm*—Covington & Burling

(57) ABSTRACT

A gene detection system for detecting a target gene upon hybridization with a probe comprising a probe-immobilizing support on which a probe is immobilized, and heating and cooling means disposed in contact with another location different from the surface of the probe-immobilizing support on which the probe is immobilized, whereby genes can be rapidly detected with high sensitivity through hybridization.

24 Claims, 8 Drawing Sheets

OTHER PUBLICATIONS

Downs, Mark, et al., "New DNA Technology and the DNA Biosensor," Analytical Letters, vol. 20 (12), pp. 1897–1927 (1987).

Hashimoto, Koji, et al., "DNA sensor for electrochemical gene detection," Preparing for Clinical Care Analyses in the 21st Century, 16th International Symposium, 1996.

Molinier–Jumel, Catherine, et al., "Electrochemical Study of DNA–Anthracyclines Interaction," Biochemical and Biophysical Research Communications, vol. 84, No. 2, pp. 441–449 (1978).

Palecek, Emil, "Adsorptive Transfer Stripping Voltammetry: Determination of Nanogram Quantities of DNA Immobilized at the Electrode Surface," Analytical Biochemistry vol. 170, pp. 421–431 (1988).

Takenaka, Shigeori, et al., "Bis–9–acridinyl Derivative Containing a Viologen Linker Chain: Electrochemically Active Intercalator for Reversible Labelling of DNA," J. Chem. Soc., Chem. Commun., vol. 21, pp. 1485–1487 (1990).

Takenaka, Shigeori, et al., "DNA Sensing on a DNA Probe-Modified Electrode Using Ferrocenylnaphthalene Diimide as the Electrochemically Active Ligand," Anal. Chem. vol. 72, pp. 1334–1341 (2000).

Takenaka, Shigeori, et al., "Electrochemically active threading intercalator with high stranded DNA selectivity," J. Chem. Soc., Chem. Commun., No. 10, pp. 1111–1112 (1998).

Takenaka, Shigeori, "Synthetic threading intercalators as a new analytical probe for nucleic acid and gene detection," Business Kagaku, vol. 48, No. 12, pp. 1095–1105 (1999), abstract only.

Takenaka, Shigeori, et al., "Threading Intercalators as a New DNA Structural Probe," Bull. Chem. Soc. Jpn, vol. 72, pp. 327–337 (1999).

Yamashita, Kenichi, et al., "Electrochemical Detection of Base Pair Mutation," Chemistry Letters, pp. 1038–1039 (2000).

* cited by examiner

GENE DETECTION SYSTEM, GENE DETECTION DEVICE COMPRISING SAME, DETECTION METHOD, AND GENE DETECTING CHIP

TECHNICAL FIELD

The present invention relates to a gene detection system, a gene detection device employing such a system, a detection method, and a chip for detecting genes, and in particular relates to a gene detection system for the rapid and highly sensitive detection of genes through hybridization.

BACKGROUND ART

Gene detection involves detecting various signals upon the hybridization of target genes to probes. Hybridization is a method for detecting a target gene sequence by exploiting the specific binding that occurs between genes with complementary base sequences (hybridization), which is a technique that has been applied in Southern hybridization, DNA microarray, and the like.

The double-stranded configuration that is produced by such hybridization depends on the environmental temperature. Given that the binding force varies according to temperature, double-stranded DNA can dissociate into single-stranded form at temperatures beyond a certain temperature (Tx). This specific temperature is unique for each probe because it is determined by probe conditions, such as the content ratio of the four types of bases as well as the number of bases forming the probe, and environmental conditions, such as the salt concentration of the solution. Only genes having a sequence that is entirely complementary to the probe will form double strands with the probe at the temperature Tx.

The greater the number of non-probe complementary bases in the sequence of the target gene, the lower the temperature Tx. The temperature must therefore be controlled during measurement in order to detect subtle variations in base sequence in the hybridization method.

In conventional gene detection systems, a solution in which the target gene has been dissolved is injected into a container covered on the outside with a heat insulating member, hybridization is then brought about as the solution is maintained at a specific temperature below Tx, and double strands are subsequently detected as a Peltier element or the like is used to heat the solution and keep the temperature at Tx, or double strands are detected after being washed with a washing solution which is at the temperature Tx.

However, because the entire solution injected into the container must be heated or cooled in conventional detection devices, the problem arises that the large amount of solution that is heated or cooled takes a longer time to reach the target temperature, resulting in a more time-consuming detection process.

Furthermore, because only the solution injected into the container is heated or cooled in conventional gene detection devices, another resulting problem is that heat is released or absorbed at the surface of portions of the probe-immobilizing support that are not in contact with the solution, making it impossible to properly control the temperature at the surface of the portions of the probe-immobilizing support that are in contact with the solution. The temperature can be particularly difficult to control when the probe-immobilizing support is made of a material with high thermal conductivity.

Although the optimal temperature Tx for the double strand configuration must be properly established for the detection of SNP (single nucleotide polymorphisms) and the like, the problem arises that it is difficult to make subtle adjustments in temperature with the kind of conventional gene detection device in which the entire solution is heated or cooled.

Furthermore, because the temperature of the solution is controlled in conventional gene detection devices, only one temperature can be set per detection cycle. When a plurality of probes having different gene sequences are immobilized on the probe-immobilizing support side, each probe will have a different Tx, but it is not possible to set a plurality of temperatures per detection cycle. Yet another resulting problem, therefore, is that the detection process takes an even longer time when a plurality of probes are immobilized because the detection process must be carried out each time at a different temperature Tx.

DISCLOSURE OF THE INVENTION

An object of the present invention is to overcome the problems described above by providing a gene detection system, gene detection device, detection method, and gene detecting chip, which are capable of rapid (high throughput) and highly sensitive gene detection, as well as reliable analysis.

To meet the aforementioned objective, the present invention is intended to provide a gene detection system for detecting a target gene upon hybridization with a probe, the gene detection system comprising a probe-immobilizing support on which a probe is immobilized, and heating and cooling means disposed in contact with another location different from the surface of the probe-immobilizing support on which the probe is immobilized.

The expression "in contact with another location different from the surface of the probe-immobilizing support on which the probe is immobilized" means that the heating and cooling means may be disposed in contact with the surface opposite the surface of the probe-immobilizing support on which the probe is immobilized, or that it may be disposed in contact on the side of the probe-immobilizing support.

A probe is a detecting element used to detect a target gene. Nucleotides having base pairs complementary to the target gene may be used as probes. Specific examples include a plurality of probes having the same or different gene sequences, such as PCR products, oligonucleotides, mRNA, cDNA, peptidic nucleic acid, or LNA (locked nucleic acid; Proligo, a trademark of LLC).

An extremely low volume is subject to temperature control in the present invention because only the temperature of the solution near the surface of the probe-immobilizing support dipped in the solution is controlled while the probe-immobilizing support is at least either heated or cooled by the heating and cooling means, resulting in a drastically shorter time to reach Tx, while also enabling rapid, highly sensitive detection.

The optimal temperature Tx for the double strand configuration may also be the melting temperature. Tx may also be a predetermined temperature lower than the melting temperature (Tm).

The present invention is also intended to provide a gene detection system wherein the heating and cooling means comprises a soaking component disposed in contact with the surface opposite the surface of the probe-immobilizing support on which the probe is immobilized, and a heating and cooling element disposed in contact with the soaking component.

The heating and cooling means may be means for only heating, means for only cooling, or means for both heating and cooling. Accordingly, the heating and cooling element is not particularly limited, provided that it functions as a temperature control element, and may also comprise a heating element, cooling element, or element for both heating and cooling.

A soaking component is provided between the probe-immobilizing support and the heating and cooling means in order to uniformly control the temperature of the probe-immobilizing support. The soaking component acts as an absorber plate when the heating and cooling means is used for heating, and acts as a heat sink when the heating and cooling means is used for cooling.

The present invention is also intended to provide a gene detection system, wherein the thermal capacity of the soaking component is greater than the thermal capacity of the probe-immobilizing support.

The thermal capacity of the soaking component and the probe-immobilizing support is determined by the specific heat and mass of the material forming them. The thermal capacity of the soaking component is greater than the thermal capacity of the probe-immobilizing support to prevent more thermal flux than is necessary from flowing away from the heating and cooling means to the probe-immobilizing support, and to ensure that the temperature of the probe-immobilizing support is kept uniform. This is also intended to prevent overshoots caused by rapid increases in the temperature of the probe-immobilizing support, and to ensure that the temperature is more carefully controlled. The temperature of the probe-immobilizing support can be kept uniform despite variability in the temperature resistance of probe-immobilizing supports when there are a plurality of probe-immobilizing supports.

The present invention also provides a gene detection system wherein the soaking component comprises a temperature sensor which controls the actuation of the heating and cooling element.

Actuating the heating and cooling element to obtain the target temperature (Tx) based on the temperature sensor measurement actuate ensures rapid and reliable temperature adjustment to Tx of only the solution near the probe-immobilizing support. Even more reliable and rapid control of the temperature of the solution near the probe-immobilizing support can be managed by feedback control, wherein a target temperature is set by predetermined target temperature setting means, and the heating and cooling element is automatically actuated so as to cancel the difference between the measured temperature and the target temperature. Furthermore, when the surface of the probe-immobilizing support or the support in its entirety is made of a material with high thermal conductivity, then the soaking component, the probe-immobilizing support, and the solution near the probe-immobilizing support can all be assumed to be the same temperature.

The heating and cooling element may be a Peltier element or heater.

The present invention is also intended to provide a gene detection system constructed in such a way that the thermal flux is propagated through the probe-immobilizing support between the heating and cooling means and a solution containing the target gene while part or all of the probe-immobilizing support is immersed in the solution containing the target gene.

In the present invention, it is possible to control the temperature of only the solution near the surface of the probe-immobilizing support which is dipped in the solution because the thermal flux is propagated between the heating and cooling means and the probe-immobilizing support, as well as between the probe-immobilizing support and the solution containing the target gene, while part or all of the probe-immobilizing support is immersed in the solution containing the target gene. As used here, the thermal flux means both positive and negative thermal flux. Specifically, when the heating and cooling means is used for heating, positive thermal flux is propagated from the heating and cooling means to the probe-immobilizing support, and is also propagated from the probe-immobilizing support to the solution. When, on the other hand, the heating and cooling means is used for cooling, negative thermal flux is propagated from the heating and cooling means to the probe-immobilizing support (heat is propagated from the probe-immobilizing support to the heating and cooling means), and negative thermal flux is also propagated from the probe-immobilizing support to the solution (heat is propagated from the solution to the probe-immobilizing support). When thermal flux is propagated into the solution, a thin temperature boundary layer is formed near the surface of the probe-immobilizing support. A rapid temperature distribution is formed in the temperature boundary layer, and only the vicinity of the surface of the probe-immobilizing support is approximately the same temperature as the temperature of the probe-immobilizing support. In the present invention, there is no need to control the temperature of the entire solution for hybridization; only the temperature of the solution near the points where the probe is immobilized need to be controlled. Because only a very low volume is subject to temperature control, the time needed to reach Tx can be drastically reduced, enabling more rapid, highly sensitive detection.

The probe-immobilizing support is preferably made of a material having a thermal conductivity of 30 W/m·K or more. A thermal conductivity of 30 W/m·K or more allows the thermal flux to be propagated through the probe-immobilizing support between the solution and the heating and cooling means, resulting in better control of the temperature near the points where the probe is immobilized. If the probe-immobilizing support has a thermal conductivity of 300 W/m·K or more, the thermal flux will be propagated more preferably and the temperature near the points where the probe is immobilized can be controlled more preferably.

The present invention is also intended to provide a gene detection system wherein the probe-immobilizing support comprises an electrode on which the probe is immobilized and an electrode substrate for supporting the electrode.

The present invention enables rapid and highly sensitive detection because, while part or all of the electrode is immersed in the solution containing the target gene, the thermal flux flows from the heating and cooling means to the electrode substrate, from the electrode substrate to the electrode, and from the electrode surface to the solution containing the target gene, allowing the temperature of only the solution near the surface of the electrode dipped in the solution to be controlled.

Electrochemical detection of probes immobilized on the electrode also permits more sensitive gene detection.

The circumferential surface of the electrode can be covered with a heat insulating member to allow the thermal flux from the heating and cooling means to flow through the electrode substrate, past the end face of the electrode, and into the solution containing the target gene. The temperature of only the solution near the end face of the electrode can be controlled as the heat is radiated or absorbed at the circumferential surface of the electrode, so as to permit even more sensitive and rapid detection.

The electrode should be pin-shaped. Either one electrode may be used, or a plurality of electrodes disposed in the form of a matrix or array may be used. The heat insulating member used to cover the electrode is preferably PEEK (polyether ether ketone) or PTFE (polytetrafluoroethylene).

Preferably, at least the surface of the electrode should be provided with a component made of a material having a thermal conductivity of 30 W/m·K or more, and the above-mentioned electrode substrate is made of a material having a thermal conductivity of 30 W/m·K or more. The expression "at least the surface of the electrode is provided with a component made of a certain material" means that the surface of the electrode may be coated with a certain material, or the electrode itself may be made of a certain material. Although it is possible for only a portion of the electrode surface to be coated with such a certain material, it must be constructed in such a way that the thermal flux flowing from the electrode substrate flows through the covered portion of the electrode surface into the solution containing the target gene. An electrode substrate with a thermal conductivity of 30 W/m·K or more will allow the thermal flux to be properly propagated from the heating and cooling means, through the electrode substrate and electrode, into the solution, so that the temperature near the points where the probe is immobilized can be properly controlled. An electrode and electrode substrate with a thermal conductivity of 300 W/m·K or more will allow the thermal flux to be propagated even more efficiently and will allow the temperature near the points where the probe is immobilized to be controlled more efficiently.

At least the surface of the electrode is preferably equipped with a component comprising gold, silver, or copper, and the electrode substrate preferably comprises a ceramic material.

The electrode referred to above may comprise a plurality of electrodes.

The present invention is also intended to provide a gene detection system wherein the electrode comprises a plurality of electrodes, with a plurality of types of probes immobilized thereon, the electrode substrate comprises a plurality of electrode substrates supporting the plurality of electrodes, and the heating and cooling means independently controls the temperature of each of the plurality of electrode substrates.

A plurality of Tx temperatures can be independently set per detection cycle by providing a plurality of electrode substrates and electrodes, immobilizing a plurality of types of probes on the electrodes, and independently controlling the temperature of the electrode substrates, as in the present invention. The hybrid state of the probes, each of which has a different Tx, can be detected all at once at the varying optimal temperatures The present invention is also intended to provide a gene detection device, comprising a gene detection system as described above, and control means for controlling the actuation of the heating and cooling means.

The present invention is furthermore intended to provide a method for detecting genes using a gene detection system as described above, wherein the heating and cooling means is actuated to adjust the probe-immobilizing support to the desired temperature, and the double strand formed upon the hybridization of the target gene with the probe is electrochemically detected.

In the present invention, the temperature of only the solution near the surface of the probe-immobilizing support is controlled by the heating and cooling means, thus permitting highly sensitive and rapid detection.

The present invention is intended to provide a method for detecting genes using the aforementioned gene detection system, the method for detecting genes comprising the step of allowing a target gene to hybridize to the probe to form a double strand, the step of measuring the electrode reaction response as the heating and cooling means is actuated to vary the temperature of the probe-immobilizing support, and the step of detecting the double strand on the basis of the relation between the temperature and the electrode reaction response. The expression "as the temperature of the probe-immobilizing support is varied" means either causing the temperature to increase or decrease.

In the present invention, double strands can be detected by measuring the electrode reaction response as the temperature of the probe-immobilizing support (the temperature of only the solution near the surface) is varied, thus permitting highly sensitive detection through more reliable timing for reaching the optimal temperature upon temperature variation. When a plurality of types of probes are immobilized on a plurality of electrodes, the electrode response which can be measured as the temperature of the probe-immobilizing support (temperature of only the solution near the surface) is varied, so that specific double strands can be simultaneously detected with high sensitivity through more reliable timing for reaching the optimal temperatures, a specific double strand can be detected when its specific optimal temperature has been reached, and another double strand can be detected when its optimal temperature has been reached once the temperature has been changed to that other temperature.

The present invention is also intended to provide a method for detecting genes wherein the electrode reaction response is continuously measured as the temperature of the probe-immobilizing support is varied. In this method, the electrode response of each electrode can be continuously scanned as the temperature is varied to permit rapid, highly sensitive detection of genes by measuring the fluctuations in current. The continuous measurement of electrode reaction response includes the periodic sampling of electrode reaction response at predetermined temporal intervals.

The present invention is furthermore intended to provide a method for detecting genes wherein DNA that is a full match with the base sequence of the probe and DNA that is a partial mismatch with the base sequence of the probe are allowed to hybridize with the probe, and the proportion in which the full match DNA and partially mismatched DNA are present is determined by continuously measuring the electrode reaction response as the temperature of the probe-immobilizing support is varied. "Full match" means that all the bases are complementary. "Partially mismatched" can mean an SNP with only 1 base mismatch, or mismatches of two or more bases. In this method, each electrode reaction response is continuously scanned as the temperature is varied, so that the dissociation state of the full match DNA and that of the mismatched DNA can be found, thereby permitting quantitative detection of the proportion in which each is present.

In the aforementioned detection method, the electrode reaction response may be measured as the heating and cooling means is actuated to continuously vary the temperature of the probe-immobilizing support. Alternatively, the electrode reaction response may be measured as the aforementioned heating and cooling means is actuated for stepwise variation of the probe-immobilizing support temperature. Stepwise variation means the temperature is increased or decreased upon the repetition of a process in which a given temperature is held for a given period of time, the temperature is then changed to a certain degree, and the temperature is then maintained at that level for a given period of time.

The present invention is also intended to provide a chip for detecting genes, comprising an electrode on which a probe is immobilized, an electrode substrate for supporting the electrode, and a soaking component disposed in contact with the surface opposite the surface of the electrode substrate supporting the electrode, wherein the soaking component includes a temperature sensor.

The chip is useful for genetic diagnosis in detecting, for example, the level of gene expression, base sequences, SNPs with a single base substitution, multiple base substitutions, point mutations, translocations, deletions, amplification, or triplet repeats. The aforementioned electrodes may comprise a plurality of pin electrodes.

Figure 1:
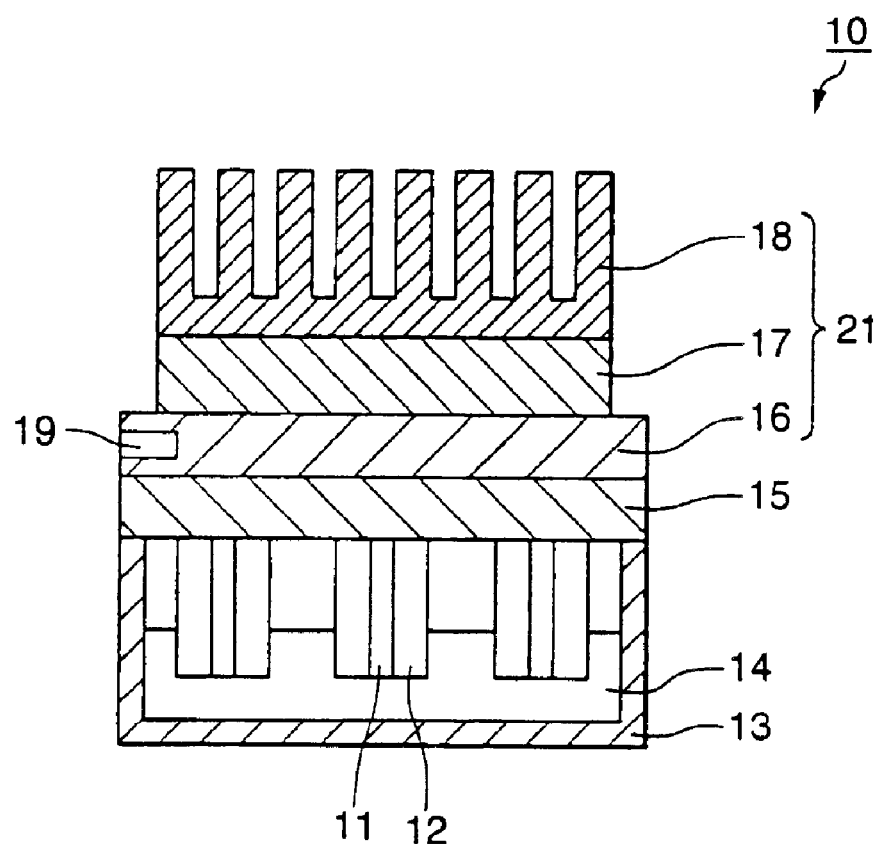
FIG. 1 is a partial cross section schematically illustrating a first embodiment of a gene detection system.

In the figures, the reference numeral 10 denotes a gene detection system, 11 an electrode, 12 a heat insulating member, 13 a container, 14 a solution, 15 an electrode substrate, 17 a Peltier element, 18 a heat sink, 19 a temperature sensor, and 20 a controller.

BEST MODE FOR CARRYING OUT THE INVENTION

Embodiments of the gene detection system, gene detection device comprising such a system, detection method, and gene detecting chip are illustrated below with reference to the drawings. The present invention is not limited to the following embodiments.

First Embodiment of Gene Detection System

FIG. 1 is a partial cross section schematically illustrating a first embodiment of a gene detection system. In FIG. 1, the gene detection system 10 comprises an electrode substrate 15 for supporting an electrode, a plurality of pin-shaped electrodes 11 disposed on the electrode substrate 15, a heat insulating member 12 covering the peripheral surface of the electrodes, a rectangular container 13 open at the top, a solution 14 containing the target gene which is injected into the container, and heating and cooling means 21. The container 13 consists of a heat insulating material.

The heating and cooling means 21 comprises a soaking component 16 disposed in contact with the surface opposite the surface of the electrode support on which the electrodes are supported, a Peltier element 17 disposed in contact with the soaking component, and a heat sink 18 disposed in contact with the Peltier element to release the heat of the Peltier element. The soaking component 16 comprises a temperature sensor 19. The controller described below is connected to the Peltier element 17 and the temperature sensor 19.

The surface of the pin electrodes 11 is entirely gold-plated, and the electrode substrate 15 consists of a ceramic material. The heat insulating member 12 consists of PEEK.

Probes of the same gene sequence are immobilized on the individual electrodes 11. Probes that may be used include chemically synthesized DNA or genes which have been extracted from a biological material, then cleaved with restriction enzymes, and then purified such as by isolation through electrophoresis. The probe sequence should be determined beforehand. Probes may be sequenced by common means.

Well-known methods may be employed to immobilize the probes on the electrodes. For example, in the case of gold probes, thiol groups (SH groups) may be introduced into the probe itself to allow the probe to bind to the electrode through the gold-sulfur coordinate linkages between gold and sulfur. Methods for introducing thiol groups into probes themselves include the method of Mizuo Maeda, Koji Nakano, Shinji Uchida, and Makoto Takagi in *Chemistry Letters,* 1805–1808 (1994), and the method of B. A. Connolly in Nucleic Acids Rs., 13, 4484 (1985). Probes with thiol groups obtained by the above methods are added in the form of drops onto the gold electrodes and are allowed to stand for several hours at a lower temperature (such as 4° C.) to allow the probe to become immobilized on the gold electrodes.

In another method, glassy carbon can be oxidized with potassium permanganate to introduce a carboxylic acid into the electrode surface to form amide bonds with modified amino groups and immobilize the probe. A method for immobilizing probes on glassy carbon is described by Kelly M. Millan and Susan R. Mikkelsen in *Analytical Chemistry,* 65, 2317–2323 (1993). For pretreatment before gold plating the surfaces of electrodes or for SH-gold bonds, see, for example, C. D. Bain in *J. Am. Chem. Soc.,* 111, pp. 321~1989, or J. J. Gooding in Anal. Chem., 70, P2396~1998.

Detection Method Using Gene Detection System in the First Embodiment

Figure 2:
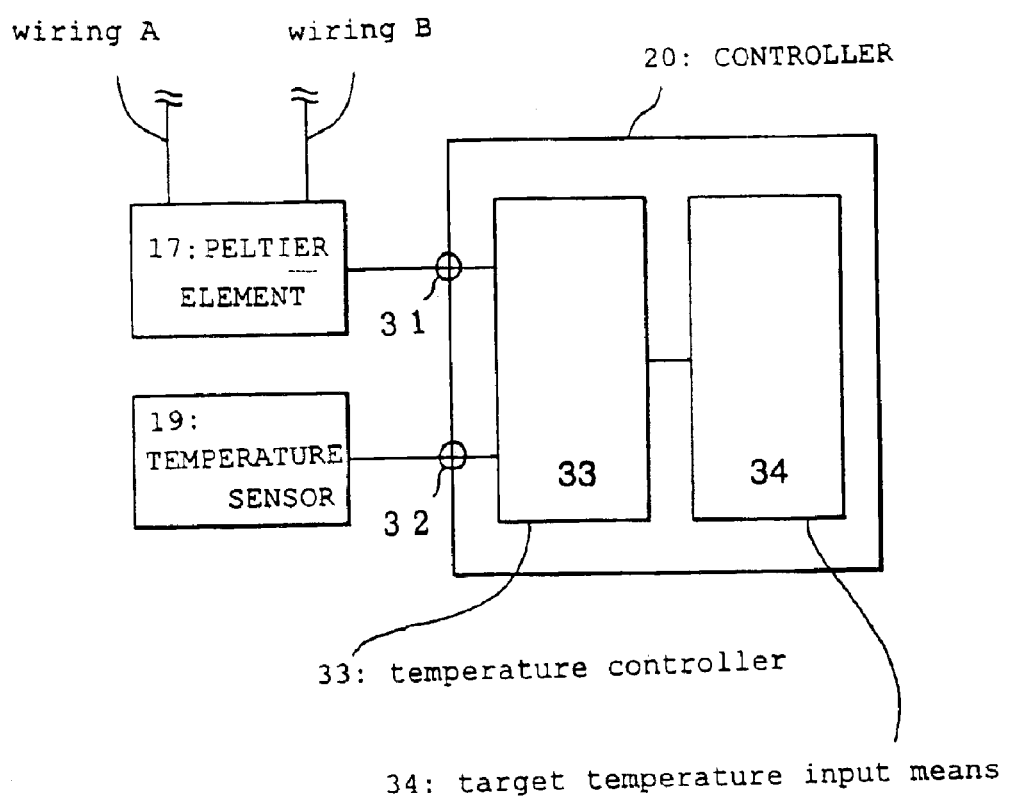
FIG. 2 is a block diagram illustrating the layout of the controller, heat sink, Peltier element, and temperature sensor in the first embodiment.
Figure 3:
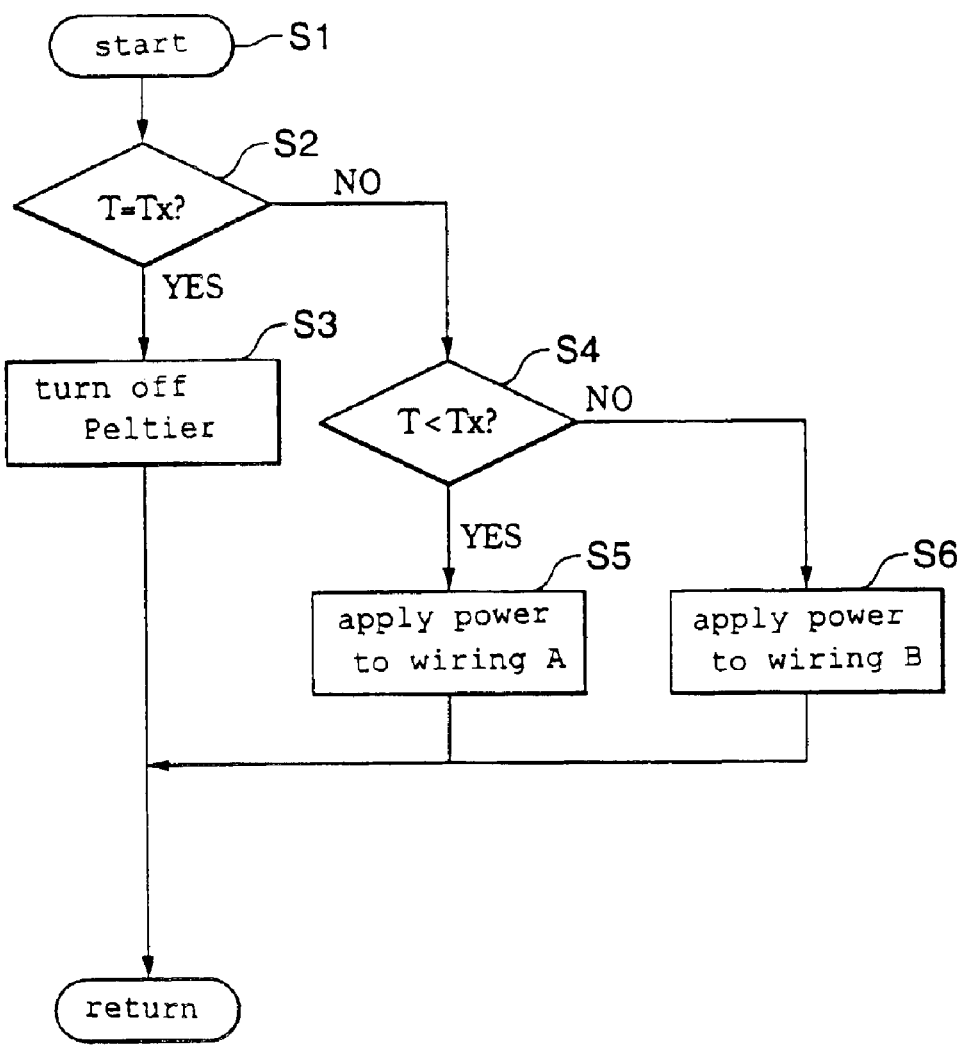
FIG. 3 is a flow chart of the controller operation in the first embodiment.

FIGS. 2 and 3 illustrate a detection method using the gene detection system in FIG. 1.

FIG. 2 is a block diagram illustrating the layout of the controller 20, Peltier element 17, and temperature sensor 19, and FIG. 3 is a flow chart showing the operation of of the controller 20 in FIG. 2.

As illustrated in FIG. 2, the controller 20 comprises an output side terminal 31, input side terminal 32, a temperature controller 33 made of a microcomputer system or the like connected to the output side terminal 31 and input side terminal 32, and a target temperature input means 34 connected to the temperature controller 33. The temperature sensor 19 is connected to the input side terminal 32. The Peltier element 17 is connected to the output side terminal 31. When the target temperature is input by the target temperature input means 23, the target temperature Tx is set by the temperature controller 33. The temperature controller 33 compares the target temperature (Tx) and the measured temperature (T) input by the input side terminal 32, and transmits a processing signal to the output side terminal 31 according to the results to either turn on or off the current of the Peltier element 17 or to switch the direction of the current.

A more detailed description is given below with reference to the flow chart of FIG. 3.

The target temperature (Tx) and the hybridization time (Δt) are first input by the target temperature input means 34 to set the target temperature Tx and time Δt in the memory of the temperature controller 33. When the detection process is started (S1), the temperature controller 33 reads the measured temperature (T) from the temperature sensor 32 and determines whether or not the measured temperature T matches the target temperature Tx (S2). When the measured temperature T does not match the target temperature Tx, the temperature controller 33 determines whether the measured temperature T is lower than the target temperature Tx (S4).

If the temperature T is lower than the target temperature Tx (T<Tx), power is applied to the wiring A of the Peltier element 17 (S5), and positive thermal flux is propagated from the Peltier element 17 through the soaking component 16 to the electrode substrate 15 and electrodes 11 to heat the solution near the electrode surface. When the measured temperature T matches the target temperature Tx (T=Tx), the Peltier element 17 is turned off (S3).

If the temperature T is higher than the target temperature Tx (T>Tx), power is applied to the wiring B of the Peltier element 17 (S6), and negative thermal flux is propagated from the Peltier element 17 through the soaking component 16 to the electrode substrate 15 and electrodes 11 to cool the solution near the electrode surface.

The feedback control of the Peltier element 17 by the temperature controller 33 based on the measured temperature of the temperature sensor 19 thus keeps the measured temperature T at the target temperature Tx.

At that time, due to the presence of the soaking component 16, the temperature of the electrode substrate 15 is kept at a constant level, ensuring that thermal flux having the same quantity of heat is propagated to the surface of each of the electrodes 11. Because the electrode substrate 15 and the electrodes 11 are made of material having high thermal conductivity, the temperature of the electrode surface and the temperature of the soaking component 16 measured by the temperature sensor 19 are substantially the same. Heating and cooling are thus managed while adjusted in such a way that the measured temperature of the temperature sensor 19 is continuously varied.

Only the portion of solution near the tips of the electrodes immersed in the solution are at the target temperature Tx while the measured temperature T matches the target temperature Tx. Conditions where T=Tx will result in the hybridization of the target gene having a sequence complementary to the probe, forming double strands. The temperature control process may involve actuating a timer when the measured temperature T matches the target temperature Tx, and employing an alarm to signal the conclusion of hybridization when Δt has elapsed. Following the conclusion of hybridization, various types of electrical signals can be detected to detect the sequence of the target gene.

Hybridization brought about in the manner described above permits rapid, highly sensitive detection with minimal solution volume heated or cooled to the target temperature Tx or maintained at the target temperature Tx.

Well-known methods can be employed to prepare the solution containing the target gene and to undertake hybridization.

The present embodiment was of an example in which the Peltier element is actuated and controlled by the controller, but the Peltier element and the heat sink may both be controller by the controller.

Another Detection Method Using the Gene Detection System in the First Embodiment Another detection method using the gene detection system in the first embodiment in FIG. 1 is illustrated below with reference to FIG. 4. FIG. 4 is a schematic illustrating the relationship of the detection current to temperature in this example of detection.

Figure 4A:
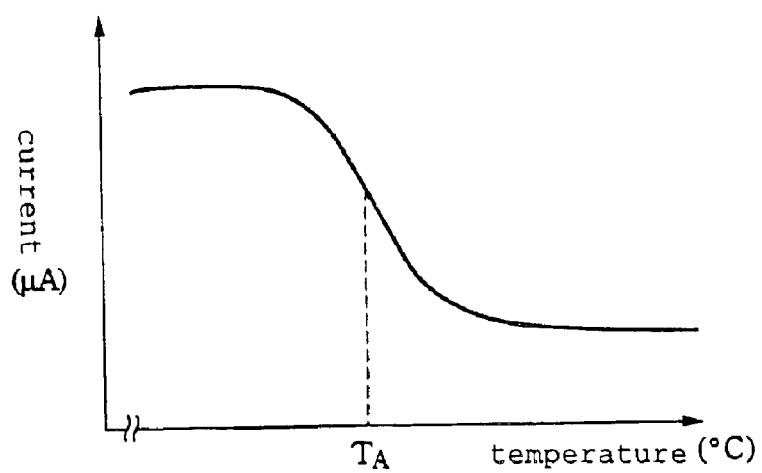
FIG. 4 is a schematic illustrating the relationship between temperature variation and detection current variation in the first embodiment.
Figure 4B:
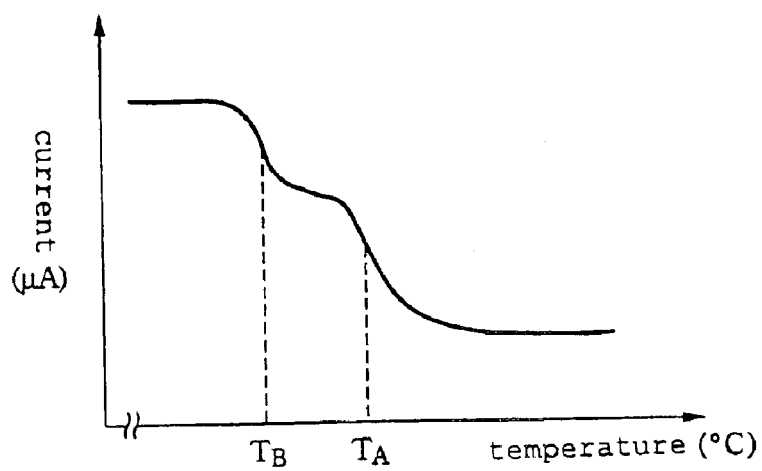

As illustrated in FIG. 4, the detection current is continuously measured as the temperature of the probe-immobilizing support is increased. As illustrated in FIG. 4(a), when only fully matching DNA is hybridized to the probe, the detection current varies considerably at the measured temperature TA of the temperature sensor. When both fully matching DNA and mismatched DNA are hybridized as illustrated in FIG. 4(b), current caused by the mismatched DNA is produced at the measured temperature TB in addition to the current caused by the fully matched DNA. The changes in current at measured temperature TA and the changes in current at measured temperature TB can be measured to calculate for each electrode the proportion of fully matched DNA and mismatched DNA (ratio of amounts in which they are present) in the DNA hybridized to the probe.

Second Embodiment of the Gene Detection System, and Detection Using Such System

This embodiment differs from the gene detection system in the first embodiment in that probes with differing gene sequences are immobilized on respective electrodes. The layout of the Peltier element, temperature sensor, and controller in this embodiment is the same as in FIG. 2.

Figure 5:
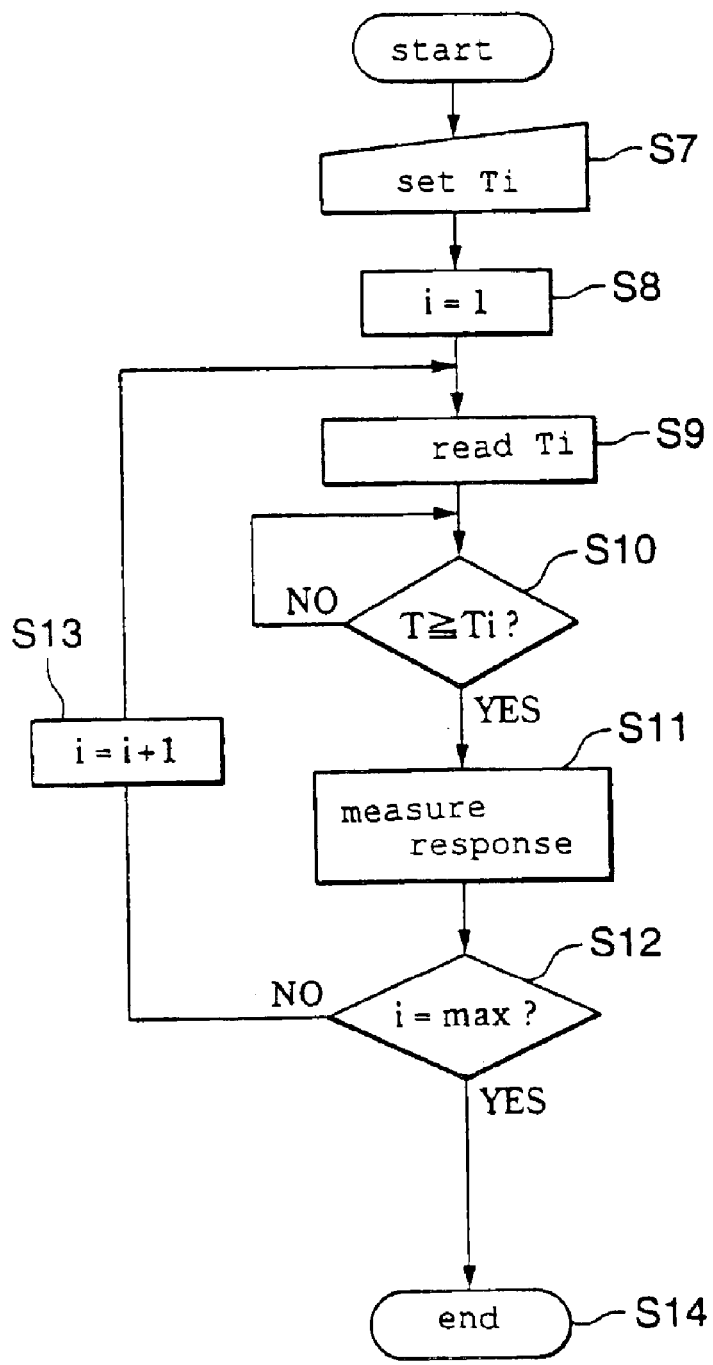
FIG. 5 is a flow chart of the controller operation in a second embodiment.
Figure 6:
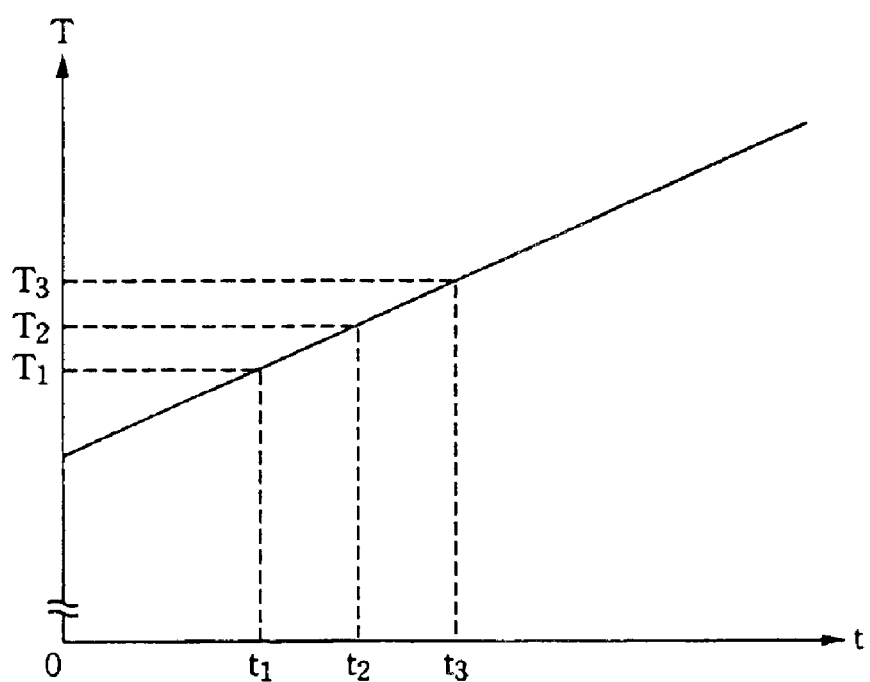
FIG. 6 illustrates the relationship between temperature variation and detection current variation in the second embodiment.

The detection process using the gene detection system in this embodiment is illustrated below with reference to FIGS. 5 and 6. FIG. 5 is a flow chart of the controller operation. FIG. 6 illustrates the relationship between temperature and time in the detection in this embodiment.

The target gene is first hybridized to the probe at a temperature lower than the target temperatures (Ti) to form double strands. The solution containing the double strands is injected into the container 13.

Next, as illustrated in FIG. 5, the target temperature Ti is input by the target temperature input means 34 to set the target temperature Ti in memory (not shown) of the temperature controller 33 (S7). Because different probes are immobilized on the electrodes in this embodiment, the optimal target temperature is input for each probe. The input data are sorted in order from the lowest target temperature (i=1, i=2, . . . i=max) and tabulated.

A command to begin the detection process from the input means (not shown) of the controller 20 starts the heating and the measurement by the temperature sensor to begin the detection process for i=1 (S8). The heating process takes place continuously through the operation of the Peltier element 17, for example, until the process is concluded.

When the detection process starts for i=1, the temperature controller 33 reads the target temperature T1 from memory (S9). The electrode reaction response is measured (S11) on the basis of the time it takes for the measured temperature T determined by the temperature sensor to reach the target temperature T1 (S10). As the measured temperature increases, the hybridized double strands with lower homology dissociate, and only double strand configurations for which T1 is the optimal temperature remain by the time the target temperature T1 has been reached, allowing the electrode reaction response to be measured on the basis of that time.

It is then determined whether l=max has been reached (S12). If max has not been reached, the temperature controller 33 reads T2 from memory (S13). The detection process proceeds in this manner to the next i+1 (S13) whenever i is not max (S12). When i is max (S12), the detection process is complete (S14).

According to the illustration in FIG. 5, as the temperature of the probe-immobilizing support is increased at a constant rate, an electrode reaction response is measured on the basis of the time (t1) it takes for the measured temperature T of the temperature sensor to reach the target temperature T1, the next electrode reaction response is measured on the basis of the time (t2) it takes to reach the next target temperature T2, and another electrode reaction response is measured on the basis of the time (t3) it takes to reach the target temperature T3. Double strands can thus be detected on the basis of the relationship between the measured temperature and the electrode reaction response.

Genes can be automatically detected rapidly and with high sensitivity by measuring the electrode reaction response based on the time it takes the temperature to reach the various optimal temperatures as the temperature of each electrode is thus uniformly varied. This has the merit of permitting uniform detection on the basis of the time it takes to reach the various optimal temperatures (Tx) when a plurality of types of probes are immobilized, as in the present embodiment.

The example in the above embodiment was of different probes immobilized on a plurality of electrodes, but the present invention is equally applicable to cases in which at least two or more types of probes are immobilized, cases with one electrode, and cases in which one type of probe is immobilized on all electrodes.

Third Embodiment of the Gene Detection System

In contrast to the gene detection system of the first embodiment, advantages of this embodiment are that the same number of electrode substrates, soaking components, temperature sensors, heat sinks, and Peltier elements are provided for each electrode, where the respective Peltier element is actuated as the temperature of each of the plurality of soaking components is measured, so as to independently control the temperature of each of the electrode substrates, and that probes with differing gene sequences are immobilized on the electrodes.

In this embodiment, the controller comprises a plurality of Peltier elements, and a plurality of output and input terminals connected to their respective temperature sensors. The unique Tx for each of the plurality of probes is set by the target temperature input means of the controller.

In this embodiment, the electrodes must be disposed far enough apart from each other to avoid overlapping thermal flux convection ranges (temperature boundary layers) near the surface of the electrodes in the solution.

An advantage of this embodiment is that the temperature of each electrode substrate can be independently controlled by the controller, enabling simultaneous detecting of the hybrid state of probes having different target temperatures Tx per detection cycle, and thus rapid and highly sensitive detection.

This embodiment is applicable not only to cases in which different probes are immobilized on the plurality of electrodes, but also cases in which at least two or more types of probes are immobilized. For example, in cases where two or more probes are immobilized, each probe can be provided with a shared electrode substrate, soaking component, temperature sensor, heat sink, and Peltier element.

Figure 7:
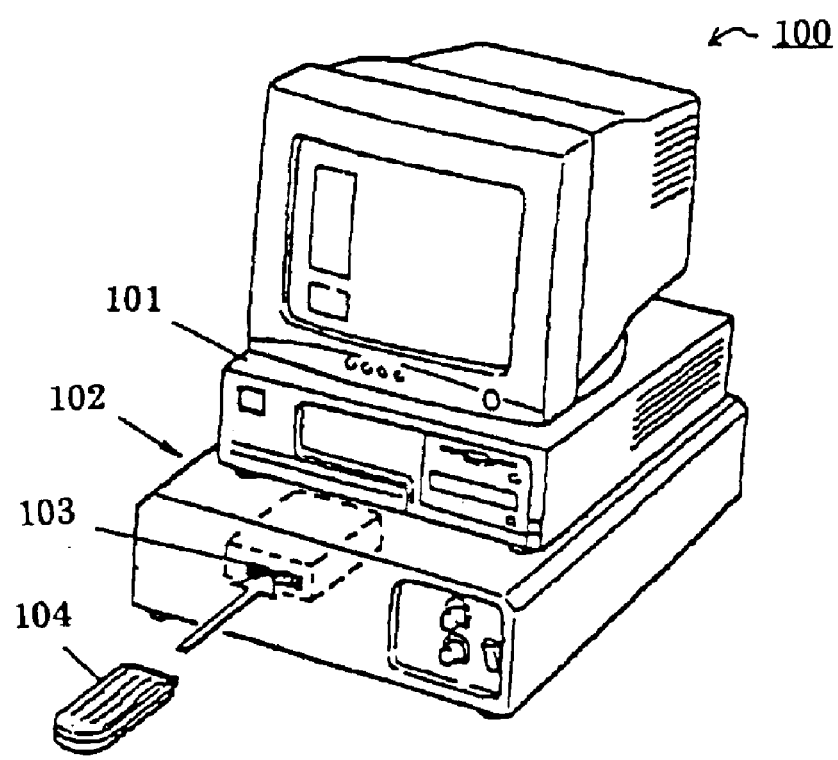
FIG. 7 is an oblique view of the entire structure of the gene detection device comprising the gene detection system in the first embodiment.

Gene Detection Device Comprising the Gene Detection System of the First Embodiment FIG. 7 is an oblique view of the entire structure of the gene detection device in the present invention.

In FIG. 7, the gene detection device 100 relating to the present invention comprises a detection chip 104, a measuring device with a mounting port 103 for inserting the detection chip 104, and a personal computer 101.

Figure 8:
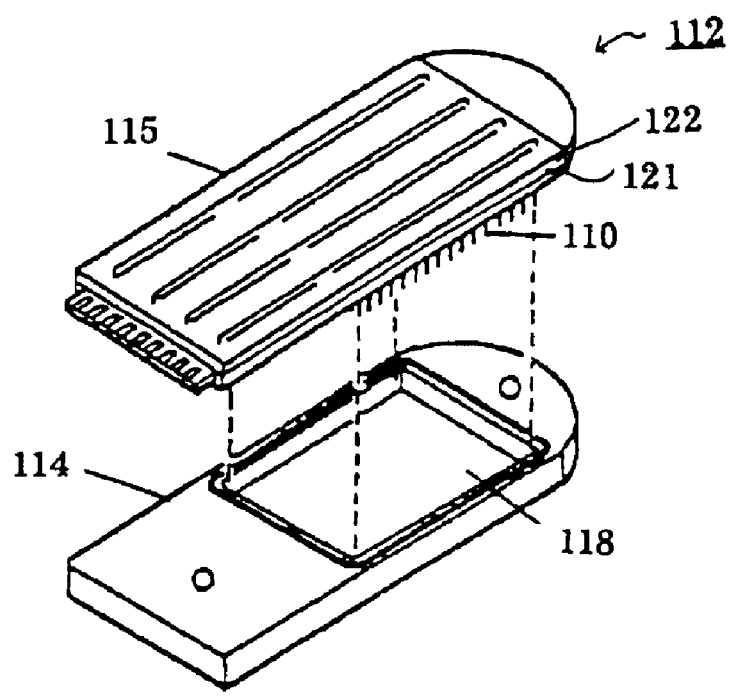
FIG. 8 is an exploded oblique view of the structure of the detection chip.

FIG. 8 illustrates the structure of the detection chip 112. As shown in FIG. 8, the chip 112 comprises a container 114 with a sink 118 formed in the center, and a main unit 115 to which the container 114 is detachably mounted. The main unit 115 comprises an electrode substrate 121, a plurality of pin-shaped electrodes 110 which are supported on the electrode substrate 121 and which uniformly project into the area corresponding to the sink 118 of the container 114, a soaking component 122 disposed in contact with the surface opposite the surface on which the electrodes 110 of the electrode substrate 121 are supported, and a temperature sensor (not shown) for measuring the temperature of the soaking component 122.

The top of the mounting port 103 of the personal computer 101 is provided with a Peltier element 123, and a heat sink disposed in contact thereabove. The controller (not shown) is provided inside the personal computer 101.

After solution containing the target gene(s) is injected into the sink 118, the main unit 115 is mounted on the container 114, and the detection chip 112 is inserted into the mounting port 103, thus bringing the soaking component 122 of the detection chip 112 into contact with the Peltier element 123 on the measuring device 102 side. The layout in the gene detection device 100 is thus as illustrated in FIG. 1. The target temperatures TX are input from the keyboard of the personal computer 101, which is the target temperature input means of the controller. Hybridization is then brought about by changing the temperature to Tx in the same manner as the detection method using the gene detection system in FIG. 1 and the controller in FIG. 2. An intercalator is then introduced into the double strands formed by the hybridization, the electrode terminal 27 and electrode terminal 20 of the main unit 115 are connected to the reception terminals (not shown in figure) of the measuring device 102 and are connected to a voltage circuit through a selection switch, and weak voltage is applied across the shared electrode and each electrode 110 to allow weak current to flow through the voltage circuit and the shared electrode between the electrodes 110 and the position labeled by the intercalator. Genes are detected by detecting the current.

The gene detection device in this embodiment can be used for highly sensitive, rapid detection because of the extremely low volume of the solution subject to temperature control.

The soaking component of the detection chip in this embodiment was described as comprising a temperature sensor, but the personal computer may also comprise a temperature sensor connected to the soaking component in order to measure the temperature.

The gene detection device comprising the gene detection system in the second embodiment may also be constructed in the same manner as this embodiment.

The example in the above embodiment was of adjustments which were made as the temperature was continuously increased, but the temperature may also be continuously decreased, as well as increased or decreased stepwise.

The example in the above embodiment was also of a plurality of pin-shaped electrodes disposed in the form of arrays on the electrode substrates, but the invention is not limited to this option.

In the example in the above embodiment, probes were immobilized on the electrodes, and electrical signals were detected, but other options include immobilizing probes on a probe-immobilizing support that is not an electrode, detecting fluorescent signals, and the like.

INDUSTRIAL APPLICABILITY

In the gene detection system, gene detection device employing such a system, detection method, and gene detection chip of the present invention, the temperature of only the solution near the surface of the electrode or the probe-immobilizing support is controlled, resulting in the possibility of rapid (high throughput), highly sensitive gene detection.

In particular, the present invention ensures that the optimal temperature Tx can be set, so as to enable reliable detection of SNPs.

The gene detection system, gene detection device employing such a system, detection method, and gene detection chip of the present invention are effective means for the analysis of gene expression or the analysis of genetic mutations in the biochemical and medical fields, and can be useful in gene diagnostics, preventive medicine, gene therapy, and drug design.

I claim:

1. A gene detection system for detecting a target gene upon hybridization with a probe, said gene detection system comprising:
    an electrode substrate having a first surface and a second surface, the first surface being opposite to the second surface through the electrode substrate;
    an electrode provided on the first surface, the electrode having a probe immobilizing surface;
    a soaking component provided on the second surface;
    heating and cooling means provided on the soaking component; and
    a heat insulating member covering a circumferential surface of the electrode,
    wherein a thermal capacity of the soaking component is greater than that of the electrode substrate.

2. The gene detection system according to claim 1, wherein the soaking component comprises a temperature sensor for measuring a temperature of the soaking component.

3. The gene detection system according to claim 1, wherein the heating and cooling means comprises a Peltier element or a heater.

4. The gene detection system according to claim 1, wherein the heating and cooling means comprises a heat sink at an opposite side from the soaking component.

5. The gene detection system according to claim 1, wherein at least a portion of a surface of the electrode comprises gold, silver, or copper, and the electrode substrate comprises a ceramic material.

6. The gene detection system according to claim 1, wherein the electrode comprises a plurality of electrodes.

7. The gene detection system according to claim 6, wherein each of a plurality of probes is immobilized on each of the plurality of electrodes, and wherein each of the plurality of probes detects a predetermined base sequence different from each of the other plurality of probes.

8. The gene detection system according to claim 6, wherein the heating and cooling means independently controls a temperature of each of the plurality of electrodes.

9. The gene detection system according to claim 7, wherein the heating and cooling means independently controls a temperature of each of the plurality of electrodes.

10. The gene detection system according to claim 1, wherein the electrode forms a pin.

11. The gene detection system according to claim 1, wherein the heat insulating member comprises polyether ether ketone or polytetrafluoroethylene.

12. A gene detection device, comprising:
    the gene detection system according to any one of claims 1–11; and
    control means for controlling an actuation of the heating and cooling means.

13. A gene detection system comprising:
    an electrode substrate having a first surface and a second surface, the first surface being opposite to the second surface through the electrode substrate;
    a cylindrical electrode projecting from the first surface of the electrode substrate, wherein a probe-immobilizing surface of the cylindrical electrode is disposed away from the electrode substrate, and wherein an insulating member substantially covers a circumferential surface of the cylindrical electrode;
    a soaking component provided on the second surface; and
    heating and cooling means disposed in contact with the soaking component,
    wherein a thermal capacity of the soaking component is greater than that of the electrode substrate.

14. The gene detection system according to claim 13, wherein the soaking component comprises a temperature sensor for measuring a temperature of the soaking component.

15. The gene detection system according to claim 13, wherein the heating and cooling means comprises a Peltier element or a heater.

16. The gene detection system according to claim 13, wherein the heating and cooling means comprises a heat sink at an opposite side from the soaking component.

17. The gene detection system according to claim 13, wherein at least a portion of a surface of the cylindrical electrode comprises gold, silver, or copper, and the electrode substrate comprises a ceramic material.

18. The gene detection system according to claim 13, wherein the cylindrical electrode comprises a plurality of cylindrical electrodes.

19. The gene detection system according to claim 18, wherein each of a plurality of probes is immobilized on each of the plurality of cylindrical electrodes, and wherein each of the plurality of probes detects a predetermined base sequence different from each of the other plurality of probes.

20. The gene detection system according to claim 18, wherein the heating and cooling means independently controls a temperature of each of the plurality of cylindrical electrodes.

21. The gene detection system according to claim 19, wherein the heating and cooling means independently controls a temperature of each of the plurality of cylindrical electrodes.

22. The gene detection system according to claim 13, wherein the cylindrical electrode forms a pin.

23. The gene detection system according to claim 13, wherein the heat insulating member comprises polyether ether ketone or polytetrafluoroethylene.

24. A gene detection device, comprising:
    the gene detection system according to any one of claims 13–23; and
    control means for controlling an actuation of the heating and cooling means.

* * * * *